L. E. PARSONS.
BINDING MECHANISM FOR CORN HARVESTERS.
APPLICATION FILED AUG. 2, 1909.
1,021,948.
Patented Apr. 2, 1912.
9 SHEETS—SHEET 2.
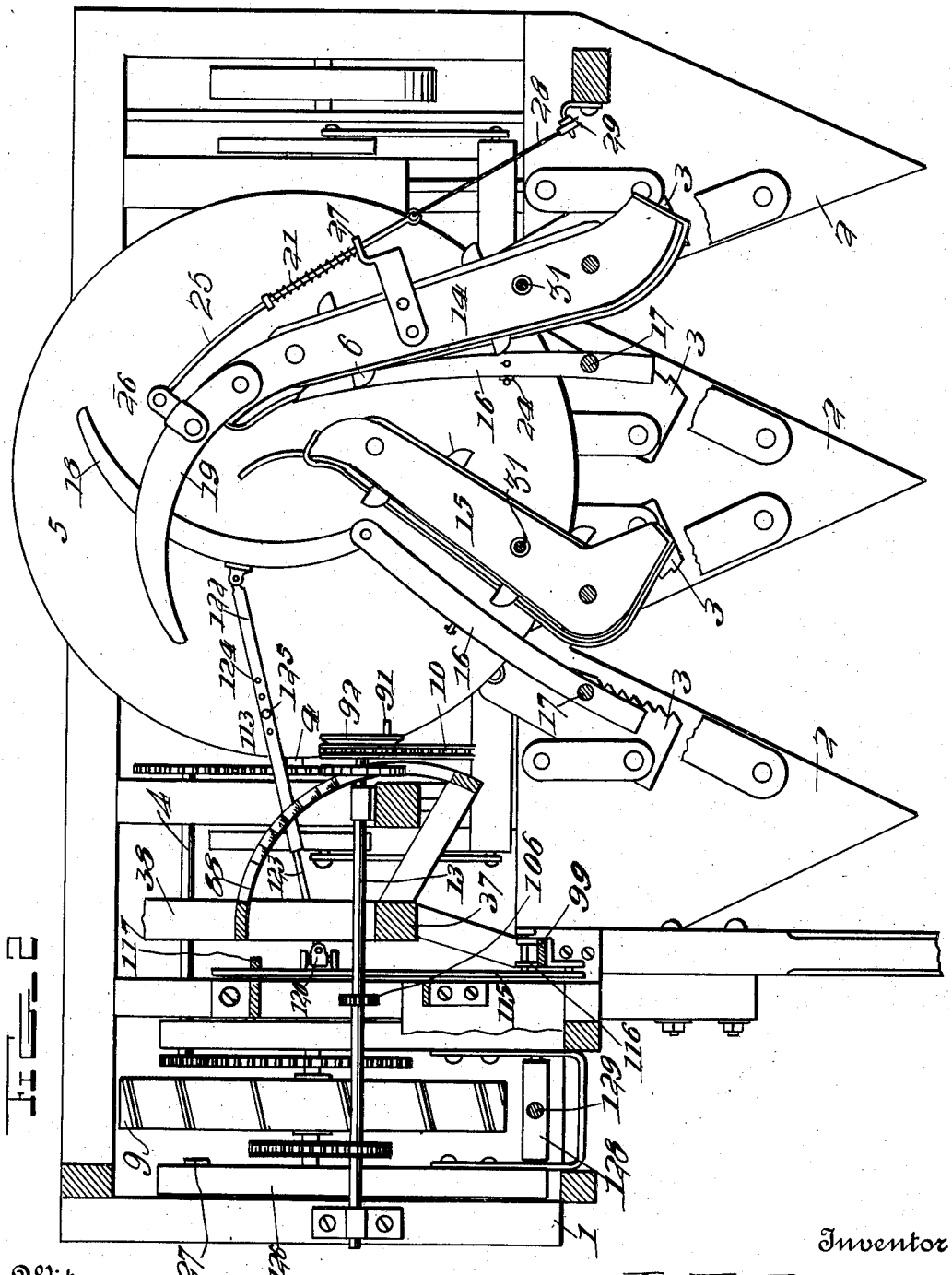
Witnesses
Inventor
L. E. Parsons,
by
Attorneys

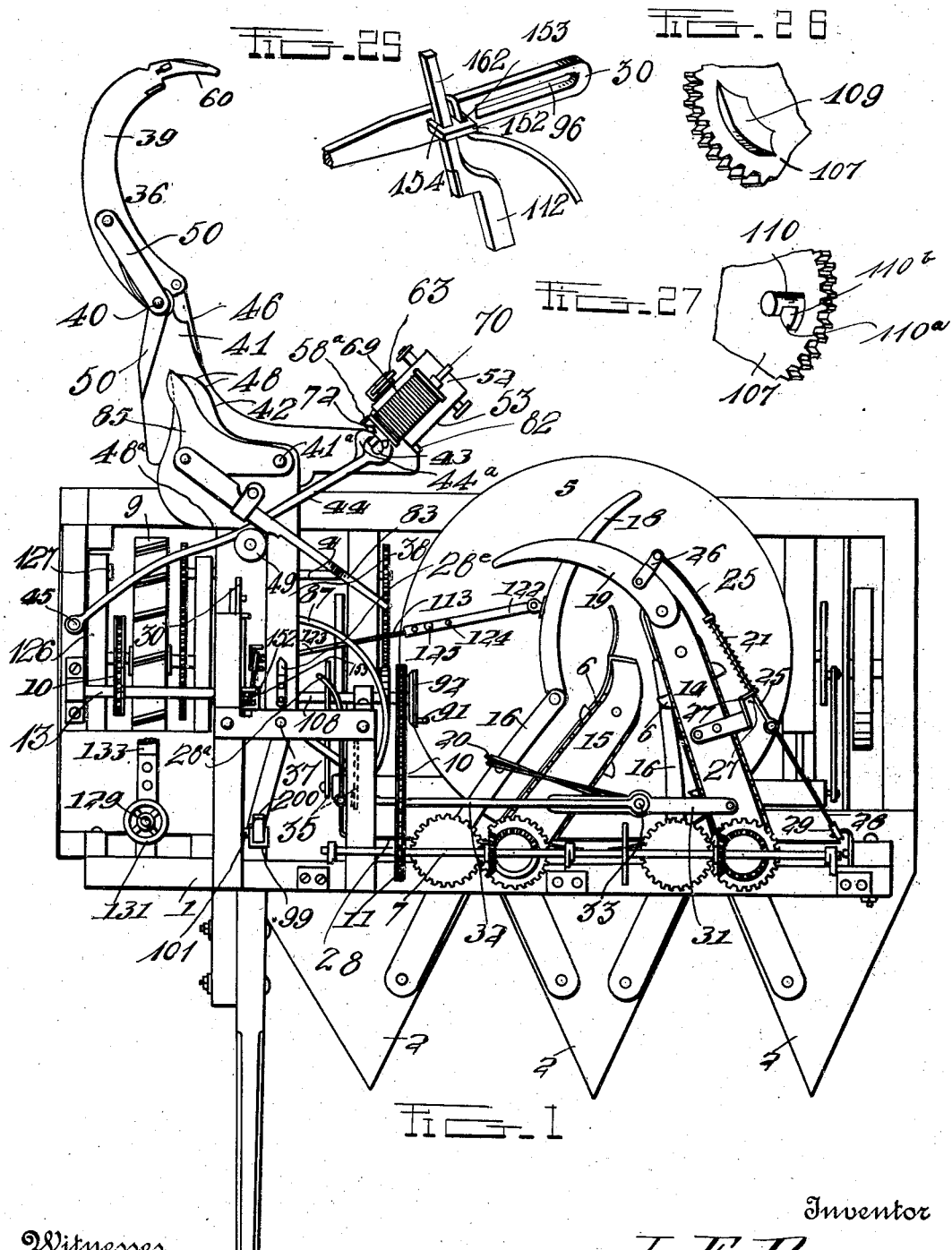

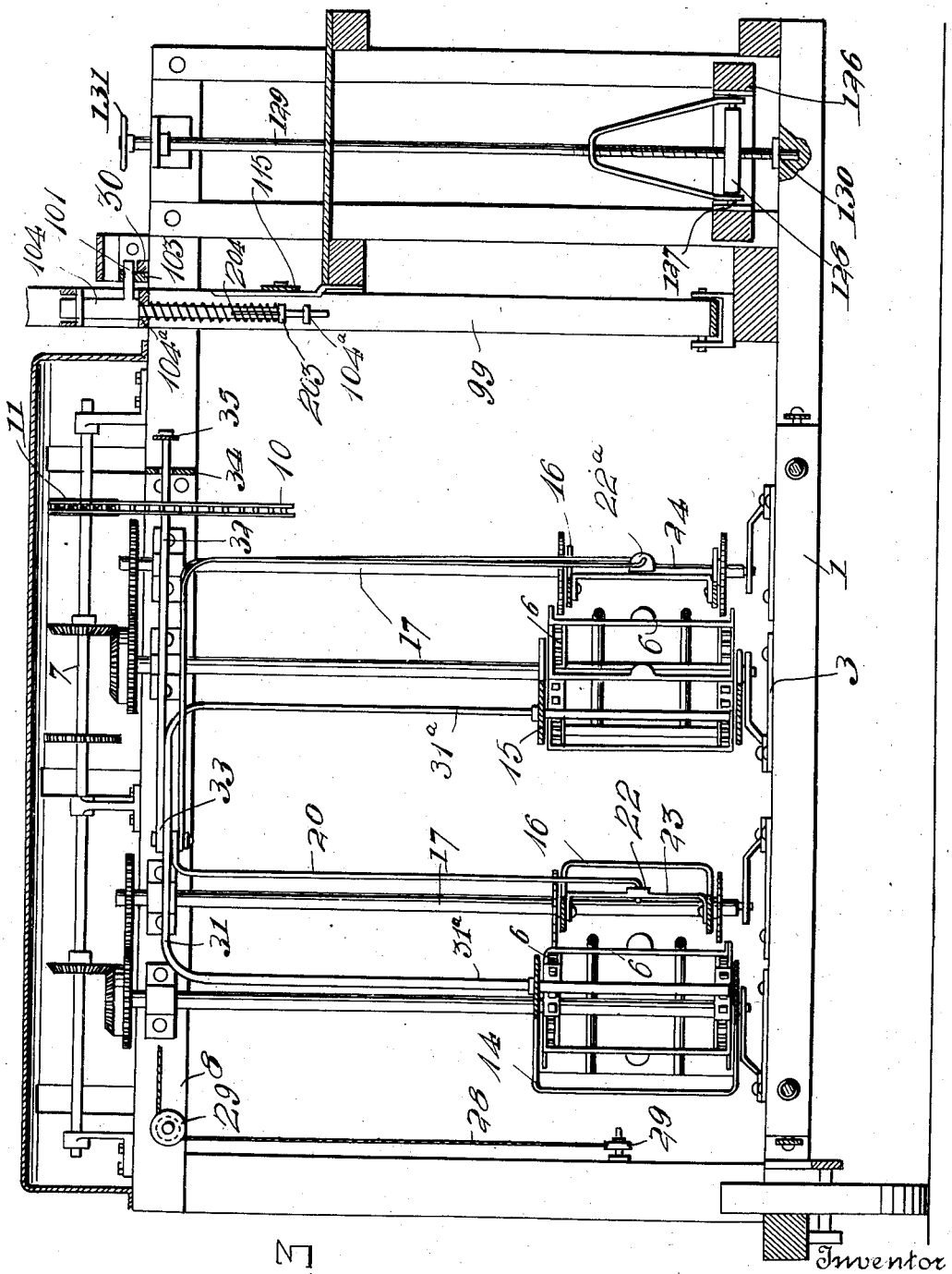

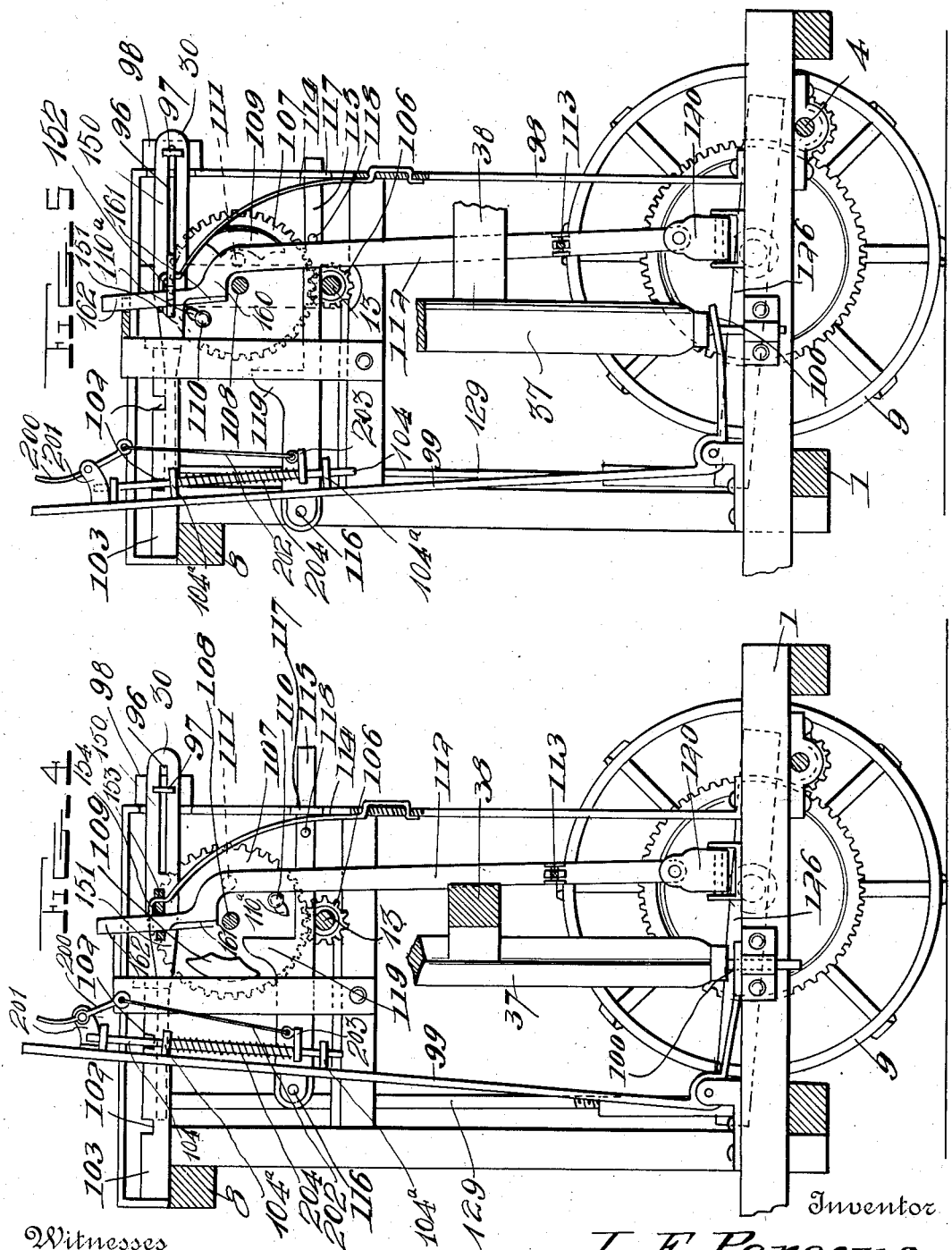

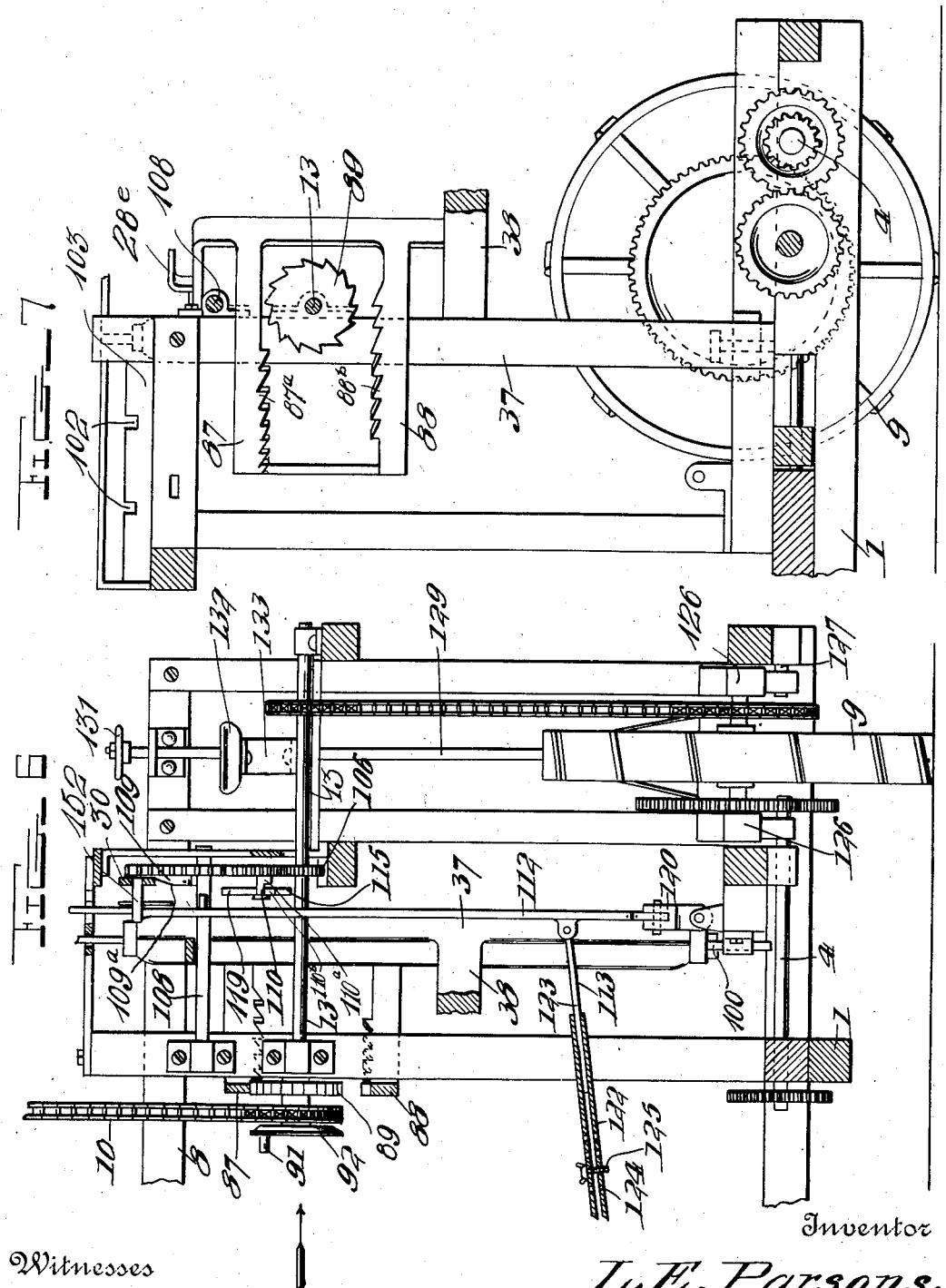

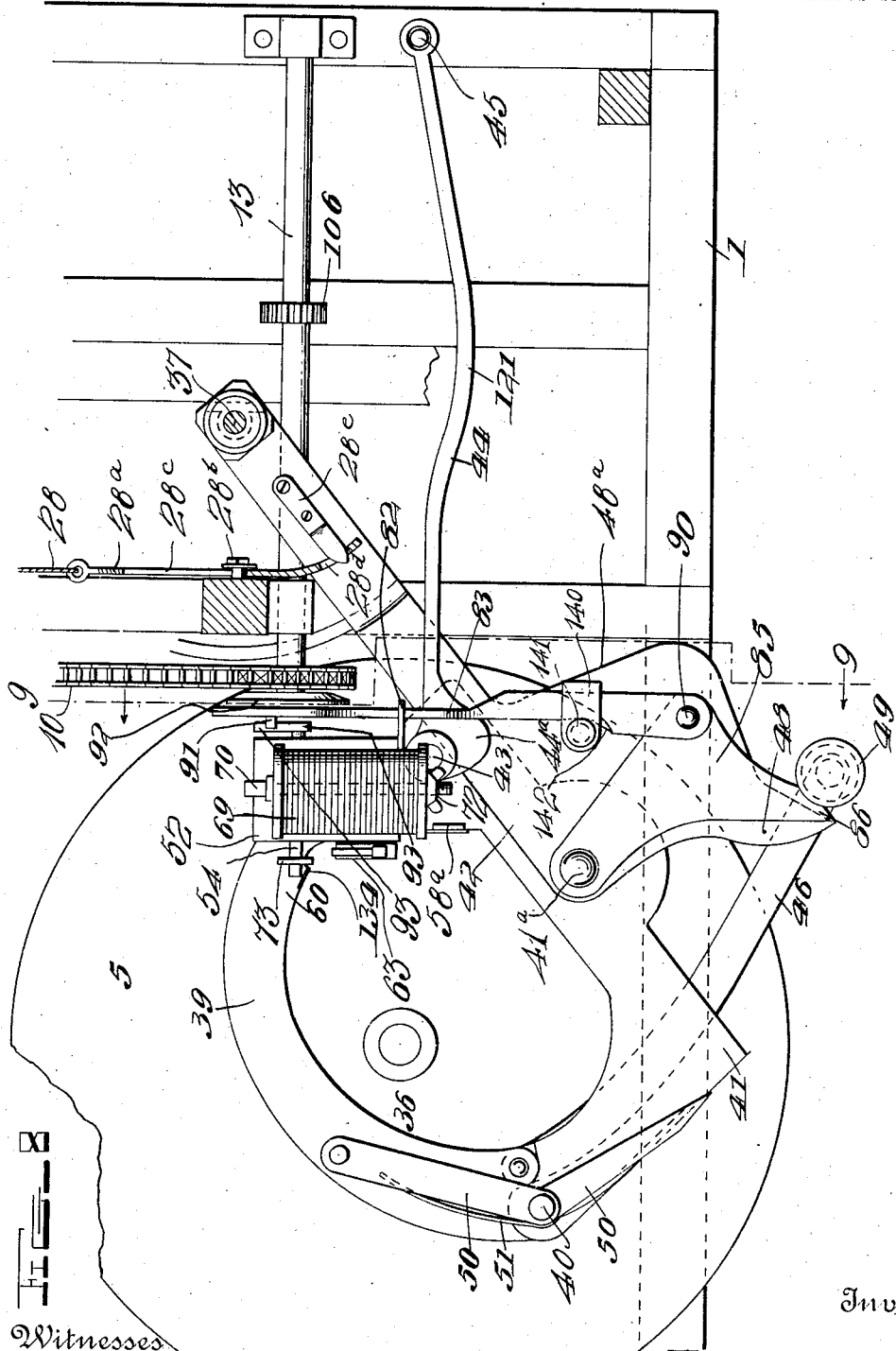

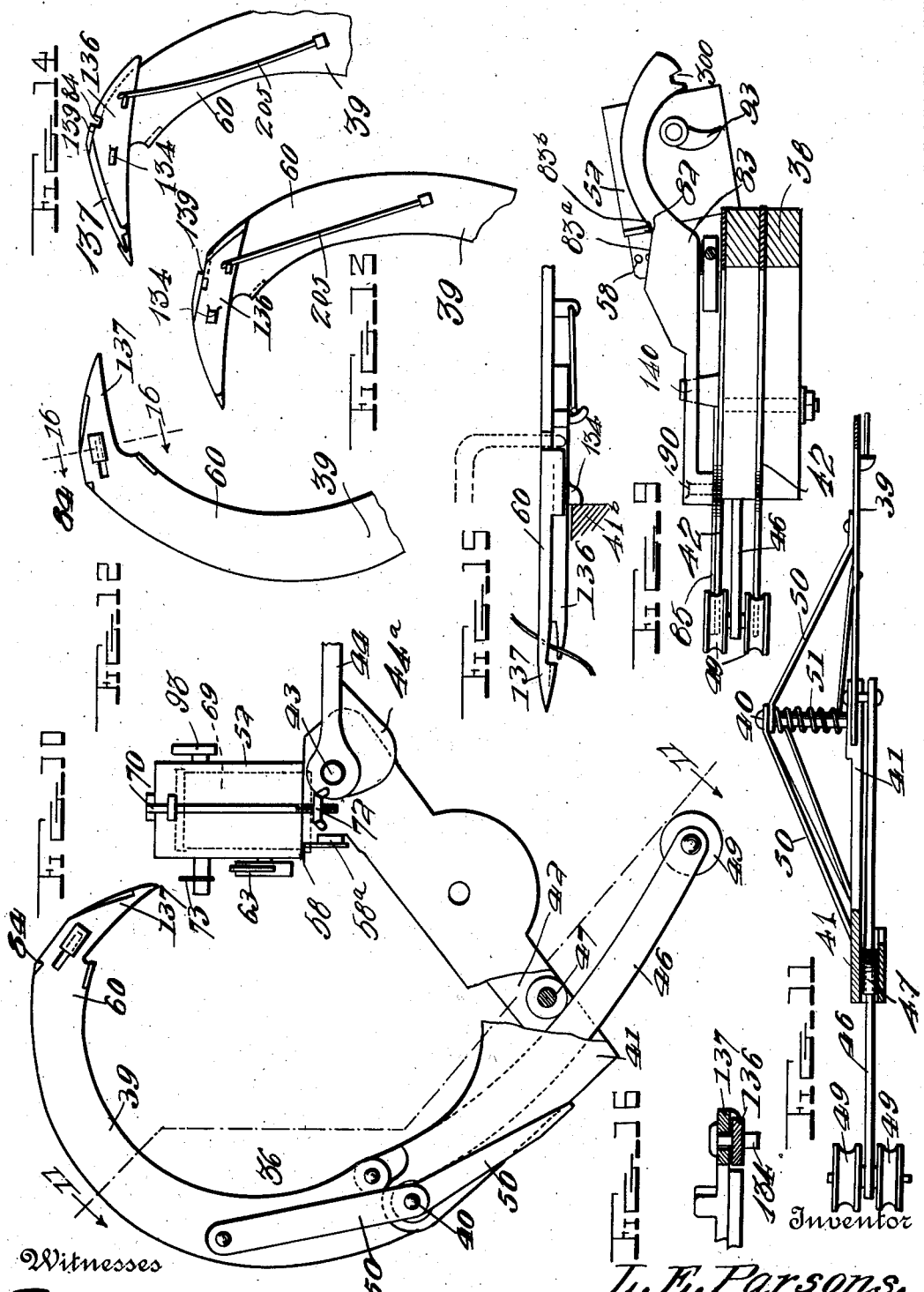

L. E. PARSONS.
BINDING MECHANISM FOR CORN HARVESTERS.
APPLICATION FILED AUG. 2, 1909.
1,021,948.
Patented Apr. 2, 1912.
9 SHEETS—SHEET 8.
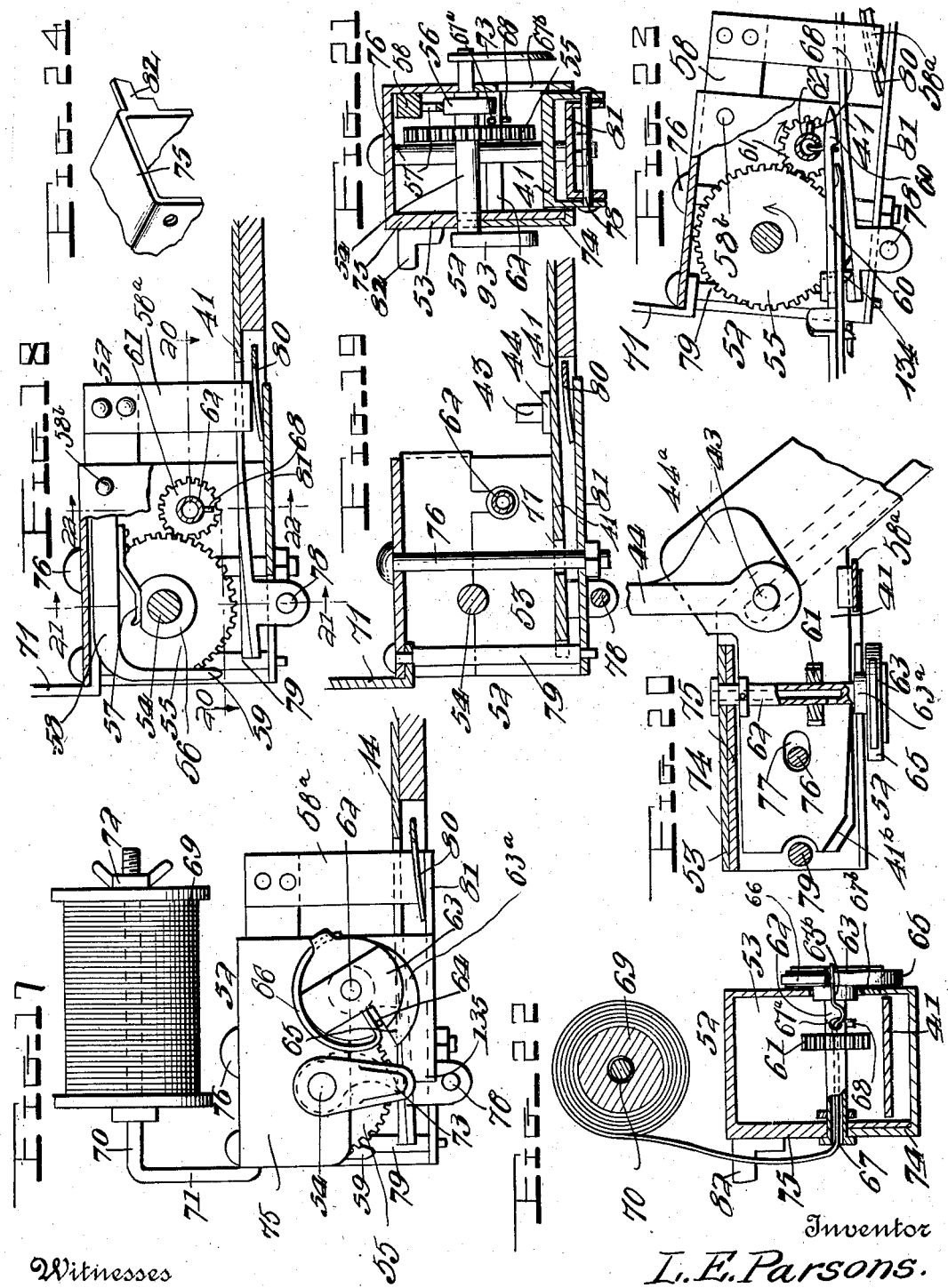
Witnesses
C. H. Griesbauer.
Inventor
L. E. Parsons.
by H. B. Willson & Co.
Attorneys

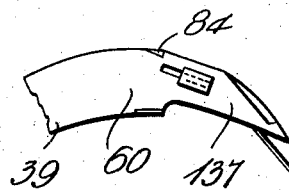
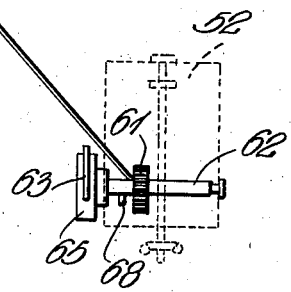
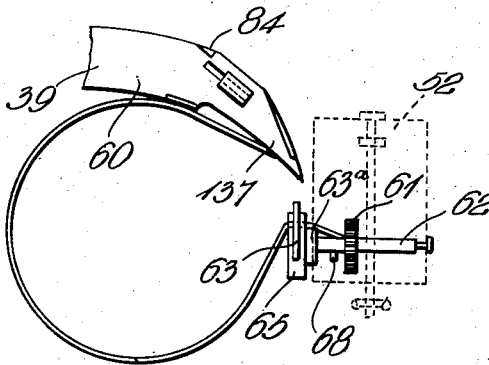
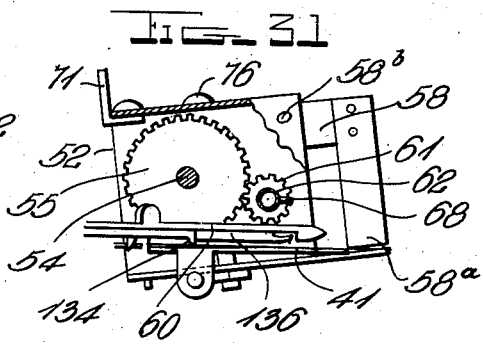
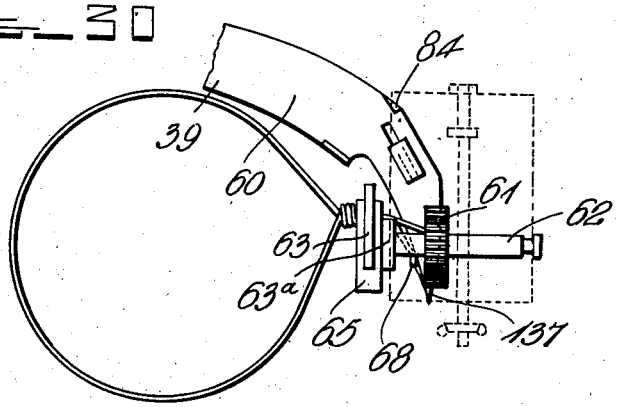

UNITED STATES PATENT OFFICE.

LEWIS E. PARSONS, OF LEWISTOWN, ILLINOIS.

BINDING MECHANISM FOR CORN-HARVESTERS.

1,021,948. Specification of Letters Patent. Patented Apr. 2, 1912.

Original application filed September 22, 1908, Serial No. 454,183. Divided and this application filed August 2, 1909. Serial No. 510,892.

*To all whom it may concern:*

Be it known that I, LEWIS E. PARSONS, a citizen of the United States, residing at Lewistown, in the county of Fulton and State of Illinois, have invented certain new and useful Improvements in Binding Mechanism for Corn-Harvesters; and I do declare the following to be a full, clear, and exact description of the invention, such as will enable others skilled in the art to which it appertains to make and use the same.

This invention relates to twisting mechanism for corn harvesters of that type illustrated in my application for Letters-Patent filed September 22, 1908, Serial No. 454,183, of which the present application is a division.

In the accompanying drawings:—Figure 1 is a plan view of a machine embodying my improvements, the shock dropping mechanism being shown in open or discharging position; Fig. 2 is a horizontal section taken above the packers; Fig. 3 is a vertical transverse section taken through the packers, looking forward; Fig. 4 is a vertical sectional view disclosing the trip mechanism for actuating the binder and dropper; Fig. 5 is a similar view showing the trip mechanism in an adjusted position; Fig. 6 is a rear view of the parts shown in Fig. 4; Fig. Fig. 7 is a vertical longitudinal section looking in the direction indicated by the arrow in Fig. 6; Fig. 8 is a plan view on an enlarged scale with parts broken away, disclosing more particularly the shock binding mechanism; Fig. 9 is a detail sectional view taken on the line 9—9 of Fig. 8; Fig. 10 is a detail plan view of the binding mechanism detached with the needle in position to enter the housing; Fig. 11 is a sectional view on the line 11—11 of Fig. 10; Fig. 12 is a top plan view of the forward end of the needle; Fig. 13 is a bottom plan view thereof; Fig. 14 is a similar view showing the needle in position to receive the wire; Fig. 15 is an edge elevation of the forward end of the needle on an enlarged scale; Fig. 16 is a transverse section taken on the line 16—16 of Fig. 12; Fig. 17 is a side elevation on an enlarged scale of the tying and binding mechanism;- Fig. 18 is a similar view partly broken away; Fig. 19 is a central longitudinal section of the same; Fig. 20 is a horizontal section taken on the line 20—20 of Fig. 18; Fig. 21 is a vertical section taken on the line 21—21 of Fig. 18; Fig. 22 is a similar view taken on the line 22—22 of Fig. 18; Fig. 23 is a longitudinal sectional view showing the housing tilted and the needle in a position to receive the wire; and Fig. 24 is a fragmentary perspective view of the forward end of the housing. Figs. 25, 26, and 27 are detail perspective views of portions of the trip mechanism for timing the operation. Figs. 28, 29 and 30 are plan views showing the various positions of the needle which engages the housing. Fig. 31 is a side elevation of the housing, partly in section, showing the interior thereof.

In the practical embodiment of my invention, the main supporting frame 1, is provided at its forward edge with a series of guards 2, upon which is operatively mounted the cutting mechanism 3 which is driven from the drive shaft 4, and is preferably of the form shown in Letters Patent 958,165, granted May 17, 1910, on a division of my application filed September 22, 1908, Serial No. 454,183, above referred to.

The cut corn or other grain is delivered upon a revolving platform 5, which is also driven from the shaft 4, by the endless carriers 6, which are driven from the shaft 7, mounted in the annex frame 8, by the connection shown and described in my application filed September 22, 1908, Serial No. 454,183. The shaft 7 is driven from the shaft 13 by a sprocket chain 10 which passes over a sprocket wheel 11, at the outer end of the shaft 7, and over a second sprocket wheel 12 on the shaft 13, said shaft 13 being driven from the master wheel 9. Packers 14 and 15 are arranged above the revolving disk platform with their forward ends arranged at the inner ends of the guards 2. The shocker consists of pairs of arms 16, pivoted at their forward ends upon the vertical shafts 17, one pair of arms having pivoted to their rear ends the curved or hook shaped shocking arms 18, adapted to coöperate with correspondingly shaped arms 19, pivoted to the rear end of one of the packers. The shocking arms 18 and 19 are normally held by means of suitable springs 20 and 21, so as to cross each other to provide for the reception between them of the cut stalks of corn as they pass rearwardly, said arms being adapted to yield outwardly or laterally as said corn accumulates and to hold the corn in compressed form to thus produce a shock.

The spring 20 is preferably a stout wire suitably bent and connected so that one end of the spring engages a projection 22 on a cross bar 23 of one pair of the arms 16, and the opposite extremity of the spring engages a projection 22$^a$ on the cross bar 24 of another pair of the arms 16. This spring may be also intermediately secured to certain other parts as hereinafter described. The spring 21 is coiled or otherwise suitably disposed about a rod 25 pivoted to a projection 26, on one of the corn shocking arms, said rod passing rearwardly through a projection 27, on one of the packers. To the free end of the rod 25 is connected a cord or other flexible element 28, passing over pulleys 29 mounted at suitable points along the machine frame and finally connected to a slide bar 28$^a$ to be hereinafter more fully described. An approximately U-shaped yoke or frame 31 is arranged with its vertical portions 31$^a$ extending through the packers near their pivots, a bar or arm 32 being fastened to the cross piece of said yoke or arm, as at 33, and extending through a guide bar 34 secured to the frame, the free end of the bar 32 being connected to a flat metallic spring 33, attached to the annex frame, which serves through the medium of the frame yoke and bar to hold the rear ends of the packers 14 and 15 in their normal contiguous positions. The intermediate portion of the spring 20 is secured at the point 33 so as to be supported and carried by the frame 31.

A binder and dropper 36 is supported crane-like in the annex frame. The crane consists of a vertically disposed upright shaft 37 which is mounted for vertical movement in the annex frame, said shaft having an arm 38 extending horizontally therefrom. The binder and dropper 36 comprises a needle arm 39 which is pivoted upon the pin 40 carried by one reduced end of an arcuate plate or bar 41, said plate or bar being pivoted intermediate its ends, as at 41$^a$, between boot-shaped cam plates 42 secured to the outer end of the horizontal arm 38 of the shaft 37. Connected to the arcuate bar 41 adjacent its inner end, as at 43, is a bar or lever 44, which is fulcrumed at its opposite end 45, to one of the bars of the annex frame. A cam 44$^a$ is formed on the lever 44 near its inner end and is adapted as hereinafter set forth to effect the dropping of the shock at the outermost position of the binder and dropper. The needle arm 39 has pivoted to its inner end a slide bar 46 which is passed through an open or slotted portion of the arcuate bar or plate 41 in contact with a friction roller 47, carried by said bar. The outer end of the slide bar 46 is provided on each side with grooved rollers 49 which travel upon the edges of the toe portion 48 and heel portion 48$^a$ of the cam plates 42, the purpose of which will hereinafter appear. Secured at one end upon the pivot pin 40 upon which is pivoted the needle arm 39, are oppositely extending brace rods 50, to the other ends of which are connected the needle arm 39 and the bar or plate 41 respectively. A spring 51 is coiled around the pivot pin 40 and has its opposite ends extended, as shown in Fig. 11, and connected to the needle arm 39 and bar 41, respectively, to normally hold the needle bar in an extended position.

52 designates the twisting or tying device which comprises a housing 53 inclosing a transverse shaft 54, upon which is fixed a pinion or gear 55 and a cam 56, upon which cam is adapted to bear a brace spring 57 suitably mounted in the housing, the spring serving to hold the cam against accidental movement when idle.

58 indicates a hook shaped member suitably secured as by a rivet 58$^b$ within the housing 53 and connected at its rear extremity to the arm 58$^a$, the beak 59 of said member being adapted to coöperate under certain conditions with the needle 60 of the needle arm 39, as will be hereinafter more fully described. A pinion 61, meshing with the gear 55, is fixed on the shaft 62 which is hollow through a portion of its length and extends transversely through the housing, upon which shaft is also secured a cam shaped twister 63 which is slitted radially, as at 64, and elongated at one side, as indicated at 65. On the periphery of the lesser portion of the twister is a stout spring 66, secured at one end to the twister and curved about the same and having its free end extended into the slit 64 to clamp and hold the wire therein, (see Fig. 17) as will be hereinafter more fully described. The binding wire or cord is threaded through the hollow portion 67 of the shaft 62 (see Fig. 22), the end of the wire or cord passing out through an aperture 67$^a$ in said shaft and extending through an elongated slot 67$^b$ in the housing to be caught in the slit 64 in the twister 63, the hub 63$^a$ of the twister being provided with a notch or groove 63$^b$ registering with the inner end of the slit 64 to receive the wire and permit the same to rotate with the shaft between the hub and the bearing provided therefor in the housing, as shown most clearly in Fig. 22. The shaft 62 is also provided with a laterally projecting pin 68 which is arranged in rear of the opening 67$^a$, relative to the direction of rotation of the shaft, and is adapted to bear against the free loop-like portion of the wire to cause the same to follow the movement of the shaft and thereby avoid twisting of the wire within the housing.

A spool 69 carrying the binding wire is suitably mounted on the horizontal portion 70 of the support 71 attached to the housing 53. As shown, the spool 69 is removably held upon the support 71 by a thumb nut 72 or other similar means. The knife or cutter 73 is fixed to the end of the shaft 54 adjacent the wire twister and is so disposed with relation to the twister as to cut the binding wire after the tying or twisting operation. It is to be observed that the pinion 61 is of smaller diameter than the pinion 55, the size of the pinions being adjusted as desired, being herein shown as of suitable diameter to allow the pinion 61 to make three revolutions while the pinion 55 is making but one, the purpose of which is to provide by its revolution for the twisting of the wire three times before it is cut.

The housing 53 is preferably made in sections, as 74 and 75, the lower section 74 at one side of the housing extending part way along the corresponding side of the upper section 75, as indicated in Figs. 20 21 and 22. At the opposite side of the housing, the lower section is cut away for the greater part of its length to provide the slot or opening 67$^b$ and the meeting edges of these sections are suitably shaped to provide bearings for the twister. The two sections of the housing are preferably held together by means of a bolt 76 passing vertically through the top and bottom of the housing and through an elongated opening 77 in the arcuate bar 41, whereby the housing may be tilted or rocked back and forth, the bottom plate 81 of the housing being pivotally mounted upon the bar 41, as indicated at 78. A post 79 braces the housing at its upper end, said post being secured to the housing at its upper end and extending through an aperture in the bottom plate 81 as shown in Fig. 19. A flat spring 80 is secured to the under face of the plate or bar 41 at one end, the free end of said spring bearing upon the upper face of the bottom plate 81 of the housing and normally depressing the inner end of the housing to carry the beak 59 of the member 58 out of the range of movement of the in-coming needle and to permit the twister and needle to grasp the binding wire preparatory to the twisting operation, in the manner hereinafter more fully described. The opposite or outer end of the housing is also caused to tilt downwardly when desired by reason of the extension 82 of the housing riding onto the upper edge of a lever 83 and into engagement with an inclined shoulder 83$^a$ directly behind the notch 83$^b$ therein, the downward movement of the forward end of the housing throwing the twisting mechanism into such position that it may be rotated in the manner hereinafter described.

Upon the face of the upper cam plate 42, is a smaller boot-shaped cam plate 85, the toe 86 of which engages the upper roller 49 on the slide bar 46 at the completion of the inward movement of the needle arm 39 to assist in retaining the needle 60 within the housing 53 while the shock is being carried by the binder and dropper to the outermost position.

The hook-shaped lever 83 which is pivoted at one end 90 to the heel of the cam plate 85, has its hook end free and, when the dropper is in its forward position arranged in the path of movement of a crank pin 91 extending laterally from a disk 92 at the extreme inner end of the shaft 13 whereby as the shaft rotates, the pin 91 will engage the notch 300 and said lever will be drawn forward so that the inclined shoulder 83$^a$ will ride under the projection 82 and tilt the forward end of the tying or twisting device downwardly so as to cause the crank pin 91 to engage the concave face of a crank 93 carried by one end of the shaft 54 and rotate said shaft, thereby rotating pinions 55 and 61, and turning the shaft 62 carrying the twisting device 63 to rotate said twisting device. The lever 83 is held to the pin 91 by the pressure exerted thereon by the housing and by a retaining or guide plate 140, while adjacent the post 141 which supports the guide plate 140, the edge of the lever 83 is inclined, as shown at 142. When said lever is moved forwardly by the pin 91, the inclined edge 142 will ride along the post 141 and force the rear end of the lever laterally, assisting to throw the toe portion of the cam plate 85 outwardly to act through the rollers 49 and impart additional movement to the slide bar 46 for the purpose of carrying the needle 60 farther into the housing 53.

Upper and lower segmental racks 87 and 88 are carried by the horizontal arm 38 of the shaft 37 to be alternately engaged by a ratchet pinion 89 secured to the shaft 13 adjacent its inner end. These segmental racks 87 and 88 are provided for a portion of their length with ratchet teeth 87$^a$ and 88$^b$ respectively, while adjacent their opposite ends the racks are stripped of the ratchet teeth to allow the pinion 89 to rotate without moving the racks in either direction, (see Figs 6 and 7).

The frame constituting the racks 87 and 88 is extended upward and secured to the shaft 37 in a bracket-like structure, shown most clearly in Fig. 7, on the upper side of which is an overhanging hook or lip 28$^e$ adapted to engage the spring slide 28$^a$ secured to the end of the cable 28. The slide is secured to the frame of the machine by a headed stud or similar device 28ᵇ inserted through the longitudinal slot 28ᶜ in the slide, as clearly shown in Fig. 8, whereby the slide will be firmly supported but may have a sliding movement limited by the ends of the slot coming in contact with the stud, as will be understood. The free end of the slide is turned away from its support and provided with an opening 28ᵈ adapted to receive the hook or lip 28ᵉ, as shown in Fig. 8. In the position of the parts shown in Fig. 1, the spring 21 holds the arm 19 in overlapping relation to the arm 18 and the cut stalks will be fed against and held by said arms to form a shock. When sufficient corn accumulates, the shaft 37 will be rotated to swing the arm 38 forward to the position shown in Fig. 8. The hook 28ᵉ will thus be caused to enter the opening 28ᵈ so that the reverse movement of the arm 38 will exert a pull on the slide 28ᵃ and the cable 28 to draw upon the arm 19 in opposition to the spring 21 and thereby cause said arm to move laterally so that it will offer no obstacle to the withdrawal of the shock by the dropper. When the end of the slot 28ᶜ reaches the stud 28ᵇ, the rearward movement of the slide will be arrested and its free end will then yield so as to disengage the hook 28ᵉ whereupon the spring 21 will return the slide and the arm 19 to their initial positions.

The slide bar 30 is formed with a widened portion 150 adjacent its rear extremity, the lower edge of said bar having an inclined portion as 151. At the forward end of said widened portion, a lug 152, projecting laterally from the inner face of the slide bar 30 intermediate its ends, is provided with elongated slots 153 and 154, suitably spaced therein. The slide bar 30 is guided in its movement by a headed stud 97 projecting from a lug 98 on the machine frame and passing through a longitudinal slot 96 in the slide bar. A lever 99, pivoted on the main frame 1 and reaching upwardly to the annex frame, provides a stop or bearing 100 for the lower end of the shaft 37, whereby when the lever is moved backwardly to its rearmost position the upper segmental rack 87 will be lowered into engagement with the ratchet pinion 89, whereby the binder and dropper will be swung around to an operative position to bind or fasten the wire about the shock. As the lever 99 is rocked to its foremost position, the shaft 37 and its attached mechanism will be elevated to bring the lower rack 88 into engagement with the ratchet pinion 89 so that the binder and dropper will again swing to its outermost position. To retain the lever 99 in its adjusted position, a slide bar 104 is suitably mounted in the apertured lugs 104ᵃ on the lever 99, this slide bar 104 having a latch 101 projecting laterally therefrom and adapted to be engaged in either of two notches 102 in a holding bar 103 secured to the machine frame. The latch 101 is adapted to rest upon the upper edge of the slide bar 30 and is automatically raised from the notches 102 at the desired time by means of said slide bar, as will be hereinafter described. A lever 200 is fulcrumed between the arms of a bracket 201, secured to the lever 99 near the upper end thereof and is connected by means of a link 202 to a lug 203 upon the slide bar 104 to longitudinally move the slide bar upon the rocking of said lever 200. To assist in quickly lowering the slide bar 104 and to normally hold the same in its lowermost position, a coiled spring 204 is interposed between the lug 203 on the slide bar and the uppermost of the lugs 104ᵃ upon the lever 99.

Intermediate the ends of the shaft 13 is mounted a pinion 106, meshing with a second and larger pinion 107 fixed to the shaft 108 suitably mounted above the shaft 13. The pinion 107 is provided on its inner face with a segmental cam 109 having an inclined inner face 109ᵃ and with a stud or pin 110 having an inclined portion 110ᵃ and a slot 110ᵇ suitably formed thereon. See Figs. 26 and 27.

A lever 112 is pivotally mounted by means of the universal joint 120 upon the machine frame and adjacent its upper end is curved forwardly, as at 160, and then extends upwardly, being provided with a beveled edge portion 161, upon the upward extension 162, opposite the pinion 107 adapted to be moved by the pressure of the corn stalks into the path of the stud 110 upon said pinion. A stud or projection 111 is also carried upon the outer face of the lever 112 and is adapted to be engaged by the segmental cam 109 upon the pinion 107 to swing the upper end of the lever away from the face of the pinion. The upper end of the lever 112 extends through the elongated slot 153 in the lug 152 projecting from the slide bar 30 and is thereby adapted to longitudinally reciprocate said slide bar, while it is capable of independent lateral movement relative to the slide bar within the elongated slot 153. A stout spring 114 is secured at its lower end to the machine frame while its upper end extends through the slot 154 in the lug 152 and presses against the upper end of the lever 112. Adjacent its lower extremity the lever 112 is connected to the innermost pair of shocker arms 18 by means of an adjustable connecting rod 113, which is herein shown as consisting of a bar 123 pivotally secured to the lever 112 and adapted to extend within a tubular rod 122 suitably secured to the shocker arms, said tubular rod being provided with a plurality of spaced apertures 124 for the reception of a stop pin 125. Owing to this construction, when the stop pin 125 is secured in any desired aperture 124, the pair of shocker arms secured to the connecting rod 113 moves laterally under the weight and impact of the cut corn, moving the tubular rod 122 upon the bar 123 until the stop pin 125 contacts with the inner end of said bar 123, the further movement of the tubular rod and bar serving to laterally swing the lever 112 into a position where the beveled edge 161 thereof will be engaged within the slotted portion 110$^b$ of the stud 110 upon the pinion 107, it being understood that the lever normally occupies a position beyond the plane of the stud toward the center of the machine.

A slide bar 115, arranged just above the shaft 13, is pivoted at its front end 116, to the lever 99, the rear end of said bar sliding through a keeper or guide 117 on the machine frame and being provided on its inner face with a laterally projecting stud 118 adapted to be engaged by the rear edge of the lever 112 when the latter is moved rearwardly by the pin 110 on the wheel 107. The slide bar 115 is provided intermediate its ends with an upwardly projecting shoulder 119, adapted to be engaged by the pin 110 under certain conditions to return the slide bar to its foremost or initial position, and swing the lever 99 to its foremost position, whereupon the latch 101 will fall into the foremost notch 102. A frame 126 is pivoted at the rear ends of its side bars, as at 127, to the machine frame and provides a bearing for the axle of the master wheel 9; the forward end of said frame being provided with a cross piece or bearing 128, through which passes a vertical screw threaded rod 129, the lower end of which is mounted in a socket 130 in one of the cross pieces forming the base of the machine frame. A suitable handle 131 is secured upon the upper end of the rod 129 upon the rotation of which by the operator the frame 126 may be adjusted upon its pivot to regulate the tension of the chain 10. The usual operator's seat, as 132, is supported upon the spring support 133 suitably secured adjacent said handle.

The machine being driven or set in motion over the field, the stalks are drawn in between and cut by the knives or cutters 3. The corn is then drawn between the packers and the shocker arms 16 by the endless carriers 6 and as it passes out therefrom is received between and formed into shocks by the shocking arms 18 and 19, the latter spreading or separating from each other under the pressure of the corn until the maximum holding capacity for which the connecting rod 113 has been adjusted is reached, the trip device is thrown into operation by the connections hereinbefore mentioned.

It is to be observed that the machine is so constructed that the various operative parts of the same are at all times under the perfect control of the operator from the driver's seat, the hand operated lever 99 being located adjacent thereto, but when the machine is desired to be operated automatically and the said lever is properly positioned, the following operation results: Assuming that the trip mechanism is in its normal or inoperative position with the supporting shaft 37 elevated and the binder and dropper in its outermost position, as shown in Fig. 1, upon the accumulation between the shocker arms of substantially the maximum capacity of cut corn, the lever 112 is rocked laterally through the connecting bar 113 to bring the beveled edge 161 thereof into engagement with the stud 110 upon the pinion 107.

During the rotation of the pinion 107, the inclined portion 110$^a$ of the stud 110 contacts with the inclined lower edge 151 of the slide bar 30 and raises said bar to thereby lift the latch 101 from the foremost notch 102 of the holding bar 103. The further rotation of the pinion then brings the slotted portion 110$^b$ of the pin 110 into engagement with the beveled edge 161 of the lever 112 and moves said lever and the slide bar 30 rearwardly against the tension of the spring 114, the rear edge of the lever 112 engaging the stud 118 upon the slide bar 115 connected to the lever 99 to thereby rock the said lever and lower the grain supporting shaft 37, the latch 101 falling into the rearmost notch 102 when the lever 99 has been rocked to its rearmost position and the ratchet pinion 89 then engaging the upper segmental rack 87. The rearward movement of the slide bar 115 brings the upwardly projecting shoulder 119 into the path of movement of the stud 110, and said stud will contact with the shoulder 119 upon the continued rotation of the pinion 107 to thereby effect the return movement of the slide bar 115 and the attached lever 99, the latch 101 falling again into the foremost notch 102 at the completion of the return movement.

The segmental cam 109 is so arranged with relation to the pin 110 (see Fig. 4) that immediately before the pin 110 engages the shoulder 119 of the slide bar 115, the cam 109 will contact with the lower edge of the slide bar 30 and elevate the same thereby lifting the latch 101 from the rearmost notch 102 to permit the forward or return movement of the lever 99. Upon the further rotation of the pinion 107 the inclined inner face of the cam 109 will engage the end of the pin or stud 111 upon the lever 112, forcing said lever and the bar 30 away from the pinion 107 and out of the path of movement of the pin 110 and cam 109 carried thereby. It will be apparent that the lever 112 will remain in this inoperative position until the shocker arms are again filled and the connecting bar 113 moved to again throw the lever into the path of movement of the pin 110.

When the lever 99 is rearwardly rocked in the manner hereinbefore described, the grain supporting shaft 37 is lowered, bringing the upper rack 87 into engagement with the ratchet pinion 89, so that as said pinion rotates, the shaft will be rotated and the arm 38 with the binder and dropper swung inwardly toward the shock. During said swinging movement, the point 43 of the plate 41 describes an arc about the point 45, being held by the rod 44, while the point 41$^a$ is moved by the arm 38 through an arc about the shaft 37 as a center. The point 40 is, consequently, swung forward and, as the bar 46 is held normally rearward by the spring 51, the rollers 49 will be caused to ride outwardly along the heel portion of the cam plate 42 thereby drawing upon the needle 39 so as to swing the same forward into the housing 53. The needle arm and needle are swung outwardly again by the action of the spring 51, thereby withdrawing the end of the wire from the twister the moment the rollers 49 have passed around the heel of the cam plate 42 and engage the edge of the toe portion 48 thereof, the toe portion of said cam plate 42 being so shaped as to allow the needle arm 39 to first spring outwardly because of the reduced diameter of the plate at this point, and then ride up the inclined portion at the tip of the toe portion to again bring the needle 60 with the binding wire within the housing 53, the wire and the needle having meanwhile encircled the shock held between the shocker arms. When the needle enters the housing 53, with the forward end of said housing tilted upwardly, as illustrated in Fig. 23, the point of the needle passes over the bottom of the loop formed in the binding wire and a projection 134 upon the lower face of the jamb 136 of the needle contacts with the inclined wall 41$^b$ at the end of the plate 41 within the housing (see Figs. 15 and 20) thereby moving the jamb 136 away from the fixed jaw 137 of the needle and permitting the wire to pass between the end of the jamb and the toe of the needle point as shown in Fig. 15. As the needle recedes from the shoulder 41$^b$, a spring 205 secured to the under side of the needle bar and the jamb, returns the jamb to its initial position so that the jamb will clamp the wire against the butt of the needle and cause the wire to be withdrawn from the twister and through the slot 67$^b$ in the side of the housing as will be understood on reference to Fig. 28. As the arm 38 continues to swing forward, the needle, as stated, will be again carried into the housing and the projection 134 will again engage the shoulder 41$^b$ so that the jamb will again be moved away from the needle. The wire, however, will not be released as it will be carried into the twister before the jamb is actuated, the twister lying normally with its projecting portion 65 extending across the slot 67$^b$, as shown in Fig. 17, in position to receive the wire. As indicated in Fig. 29, the pressure of the shock on the wire encircling the same will force the inner portion of the wire into the twister and when the needle the second time enters the housing, the end of the wire carried thereby will also be carried into the twister. When the twister begins to rotate, it will withdraw the end of the wire from the open needle and the two strands of the wire will be twisted or wrapped around each other as shown in Fig. 30. When the jamb is moved away from the needle point, a notch or aperture 84 is provided behind the shoulder 139 upon said jaw for the reception of the beak 59 of the member 58, upon the depression of the forward end of the housing which member retains the needle 60 within the housing with its jamb and jaw separated until released from said member by mechanism to be hereinafter described.

When the housing 53, tilted rearwardly by the spring 80 as described and as shown in Fig. 23, approaches the limit of its forward movement, the extension 82 on the housing, will move transversely over the lever 83 to enter the notch 83$^b$ therein just as the needle is the second time engaged by the shoulder 41$^b$. The notch 300 in the end of the lever 83 is simultaneously engaged by the pin 91 so that the lever will be drawn forward and the shoulder 83$^a$ caused to ride under the projection 82 and lift the same so that the housing will be tilted in opposition to the action of the spring 80 and the shaft 62, with the wire carried thereby, will be elevated from the path of the needle point as shown in Fig. 31. The movement imparted to the lever will cause the cam plate 85 to act upon the roller 49 and the bar 46 to draw the needle farther into the housing as above stated, and the tilting of the housing will then bring the beak 59 of the hook-shaped locking member 58 into engagement with the notch 84 thereby locking the needle within the housing. The described tilting of the housing, furthermore, will carry the crank 93 into the path of the pin 91, the shaft 54 alining with the shaft 13, so that the twisting mechanism will be actuated. Inasmuch as the cam plate 85 has forced the rollers 49 away from the cam plate 42, the bar 46 will remain inactive during the rearward movement of the arm 38 and the needle will be locked during the twisting operation until the member 58 is released. The pin 91, in rotating, will engage the concave face of the crank 93 when the forward end of the housing is thus depressed and will rotate said crank and the shaft 54 upon which it is secured, thereby revolving the pinion 55 in mesh with the small pinion 61 upon the shaft 62, it being apparent that the pinion 61 will rotate considerably faster than the larger pinion 55. As the shaft 62 revolves, the twister will revolve so as to wind or twist the strands of the binding wire to fasten the loop encircling the shock between the shocker arms. In the illustrated embodiment the twister 63 will rotate three times as fast as the other pinion 55 and the shaft 54 upon which said other pinion is secured. The knife or cutter 73, likewise secured to the shaft 54, will also revolve one-third as fast as the twister 63, so that when the wire has been wound or twisted three times, the knife or cutter 73 will be carried into contact with the wire to cut or sever the same.

The size of the pinion 107 is so related to that of the pinion 106 carried by the shaft 13 which also carries the disk 92, that while the pinion 107 is making one revolution, the pinion 106 and the disk 92 will have made a number of revolutions so that the shock will be fully bound and the wire twisted and cut before rearward movement of the dropper begins. After the twisting-mechanism has completed its operation and the binding wire after being secured about the shock has been separated by the knife or cutter 73, the stud 110 upon the pinion 107 engages with the shoulder 119 of the slide bar 115, as hereinbefore described, and rocks the lever 99 forwardly, thereby elevating the shaft 37 and the segmental racks 87 and 88, bringing the lowermost rack 88 into engagement with the ratchet pinion 89. As the pinion 89 rotates, the segmental rack 88, the horizontal arm 38, and the binder and dropper carried thereby will be swung outwardly toward its initial or outermost position carrying the shock wired and held between the arm 39 and the arcuate bar 41. The outward swinging movement of the arm 38 and the binder and dropper brings the spring 58ᵃ, to which the extremity of the member 58 is secured, against the cam plate 44ᵃ upon the bar 44, as shown in Fig. 1, whereupon the pressure upon the spring 58ᵃ will move the member 58 laterally to release the beak 59 from the notch 84 behind the shoulder 139 on the needle 60, the needle arm and needle being thereupon thrown outwardly away from the housing 53 by the action of the coiled spring 51. The outward movement of this needle arm 39 releases the shock and allows the same to fall to the ground.

It will be apparent from the shape and position of the teeth upon the segmental racks 87 and 88, as shown clearly in Fig. 7, that the ratchet pinion 89 will move said racks and their attached mechanisms until the rack has moved out of engagement with the ratchet pinion whereupon the ratchet pinion will rotate without engaging or in any way tending to move the segmental racks, remaining in this position until the crane supporting shaft 37, is lowered or elevated as the case may be to bring the toothed portion of the opposite segmental rack into engagement with the ratchet pinion.

From the foregoing description taken in connection with the accompanying drawings, the construction and operation of the invention will be readily understood without requiring a more extended explanation.

Various changes in the form, proportion and the minor details of the construction may be resorted to without departing from the principle or sacrificing any of the advantages of this invention as defined in the appended claims.

Having thus described my invention, what I claim is:

1. In a harvester, a binder and dropper comprising a curved pivoted bar, means for moving said bar about its pivot, a curved needle arm carrying a needle and pivoted to said bar, a slide bar pivoted to said needle arm at its inner end, and a cam plate upon the pivoted bar and engaged by the opposite end of the slide bar to control the movement of the needle arm when the curved bar moves about its pivot.

2. In a harvester, a binder and dropper comprising a crane-like arm, a shaft carrying the same and pivoted in the frame of the machine, parallel plates secured to said arm, a needle bar pivoted between said plates, a curved needle arm pivoted to said needle bar and carrying a needle, a slide bar pivoted to the inner end of the needle bar, and cams formed on said parallel plates and engaged by rollers on the outer end of the slide bar.

3. In a harvester, a binder and dropper comprising a crane-like arm, a shaft supporting the same and pivoted in the frame of the machine, cam-shaped parallel plates secured to said arm, a curved bar pivoted intermediate its end between said parallel cam plates, a curved needle arm carrying a needle and pivoted to said curved bar, a slide bar pivoted to the inner end of said needle arm and adapted to engage said parallel cam plates, a substantially boot-shaped cam carried by the curved bar, a hook-shaped lever supported by one of the cam plates and pivoted to said boot-shaped cam, and means actuated by said lever to lock the needle around the shock.

4. In a harvester, a binder and dropper comprising an arm, a vertically disposed movable shaft carrying said arm, two segmental vertically placed racks carried by said arm and shaft, one in vertical alinement with the other, a driving shaft provided with a pinion adapted to engage either of said racks, and mechanism for raising and lowering the vertically movable shaft to throw either of the racks into and out of gear with the pinion.

5. In a harvester, the combination with a binder and dropper, of a vertical shaft, an arm carried thereby and supporting said binder and dropper, duplicate segmental racks carried by said arm and shaft with their teeth opposed to each other, a driving shaft, a lever for raising or lowering said vertical shaft to throw the driving shaft into gear with one or the other of the segmental racks, a pinion actuated by the driving shaft and having a projection and a cam, a notched keeper bar, a slide bar connected to said shaft-lifting lever, a latch carried by said shaft-lifting lever and adapted to engage either of the notches in the keeper bar, shock-forming arms, a supplemental lever connected to one of the shock forming arms and adapted to be engaged by the projection on said pinion and itself adapted to engage a projection on said slide bar, and a lifting lever adapted to engage said spring latch and itself adapted to be engaged by the cam on the aforesaid pinion.

6. In a corn harvester, means for securing a binding wire about a shock, comprising a vertically movable shaft, an arm carried thereby, oppositely disposed segmental racks carried by said arm, a needle arm supported adjacent the end of said arm, a needle connected to said needle arm, a wire supplying device, and means engaging said segmental racks for swinging the first mentioned arm toward and away from said wire supplying device.

7. In a corn harvester, means for securing a binding wire about a shock comprising a vertically movable shaft, an arm carried by said shaft, oppositely disposed racks carried upon said arm, a plurality of cam plates mounted adjacent the end of said arm, a needle arm operatively mounted adjacent said cam plate and having a needle, rollers connected to said needle arm and adapted to contact with the cam plates, means engaging the racks to swing the first-mentioned arm and a wire supplying device, the cam plates being shaped to swing the needle into engagement with the wire supplying device, to redraw it therefrom, and return the same again to the wire supplying device during the inward movement of the first-mentioned arm.

In testimony whereof I have hereunto set my hand in presence of two subscribing witnesses.

L. E. PARSONS.

Witnesses:
HARVEY H. ATHERTON,
W. B. HUGHES.